United States Patent [19]

Beig et al.

[11] 4,429,196
[45] Jan. 31, 1984

[54] REVERSING SWITCH FOR MOTOR VEHICLE TRANSMISSION

[75] Inventors: Willy Beig; Günter Schwarz, both of Friedrichshafen, Fed. Rep. of Germany

[73] Assignee: Zahnradfabrik Friedrichshafen AG, Friedrichshafen, Fed. Rep. of Germany

[21] Appl. No.: 307,946

[22] Filed: Oct. 2, 1981

[30] Foreign Application Priority Data

Oct. 4, 1980 [DE] Fed. Rep. of Germany ....... 3037578
Jul. 21, 1981 [DE] Fed. Rep. of Germany ....... 3128752

[51] Int. Cl.$^3$ .............................................. H01H 9/00
[52] U.S. Cl. ................................. 200/61.54; 200/61.88
[58] Field of Search .............. 200/5 R, 6 R, 6 A, 6 B, 200/7, 61.27–61.3, 61.54, 61.88, 61.89, 61.91, 153 T, 291, DIG. 29

[56] References Cited

U.S. PATENT DOCUMENTS

| | | | |
|---|---|---|---|
| 1,653,517 | 12/1927 | Smith | 200/61.27 X |
| 2,878,347 | 3/1959 | Schmidt | 200/302 |
| 3,304,800 | 2/1967 | Russell | 200/291 X |
| 3,360,620 | 12/1967 | Ward | 200/6 A |
| 3,443,045 | 10/1969 | Wintriss | 200/DIG. 29 |
| 3,657,493 | 4/1972 | Horsley | 200/6 B |
| 3,679,846 | 7/1972 | Dillon et al. | 200/153 T X |
| 3,809,833 | 5/1974 | Miller et al. | 200/61.27 |
| 3,919,510 | 11/1975 | Barnes | 200/61.88 |
| 4,081,634 | 3/1978 | Bull | 200/61.27 |
| 4,091,372 | 5/1978 | Blaha et al. | 200/61.88 X |
| 4,334,130 | 6/1982 | Beig | 200/61.54 |

FOREIGN PATENT DOCUMENTS

| | | |
|---|---|---|
| 323791 | 8/1920 | Fed. Rep. of Germany . |
| 2252634 | 10/1980 | Fed. Rep. of Germany . |
| 6944518 | 9/1971 | France . |
| 561004 | 5/1944 | United Kingdom . |
| 1327040 | 8/1973 | United Kingdom . |

Primary Examiner—J. R. Scott
Attorney, Agent, or Firm—Karl F. Ross; Herbert Dubno

[57] ABSTRACT

A reversing or direction-selector switch for a transmission of a motor vehicle having an electro-hydraulically controlled transmission unit which can be switched over from forward to reverse drive by the switch. According to the invention, a switch lever has a one-piece construction with at least a pair of cams for actuation of sensitive switches (microswitches) and forms a pivot body from which the lever arm of the switch lever is mounted and also is provided with a guide for receiving an indexing means, for example, a ball detent for releasably positioning the lever in one of the selected positions thereof.

8 Claims, 5 Drawing Figures

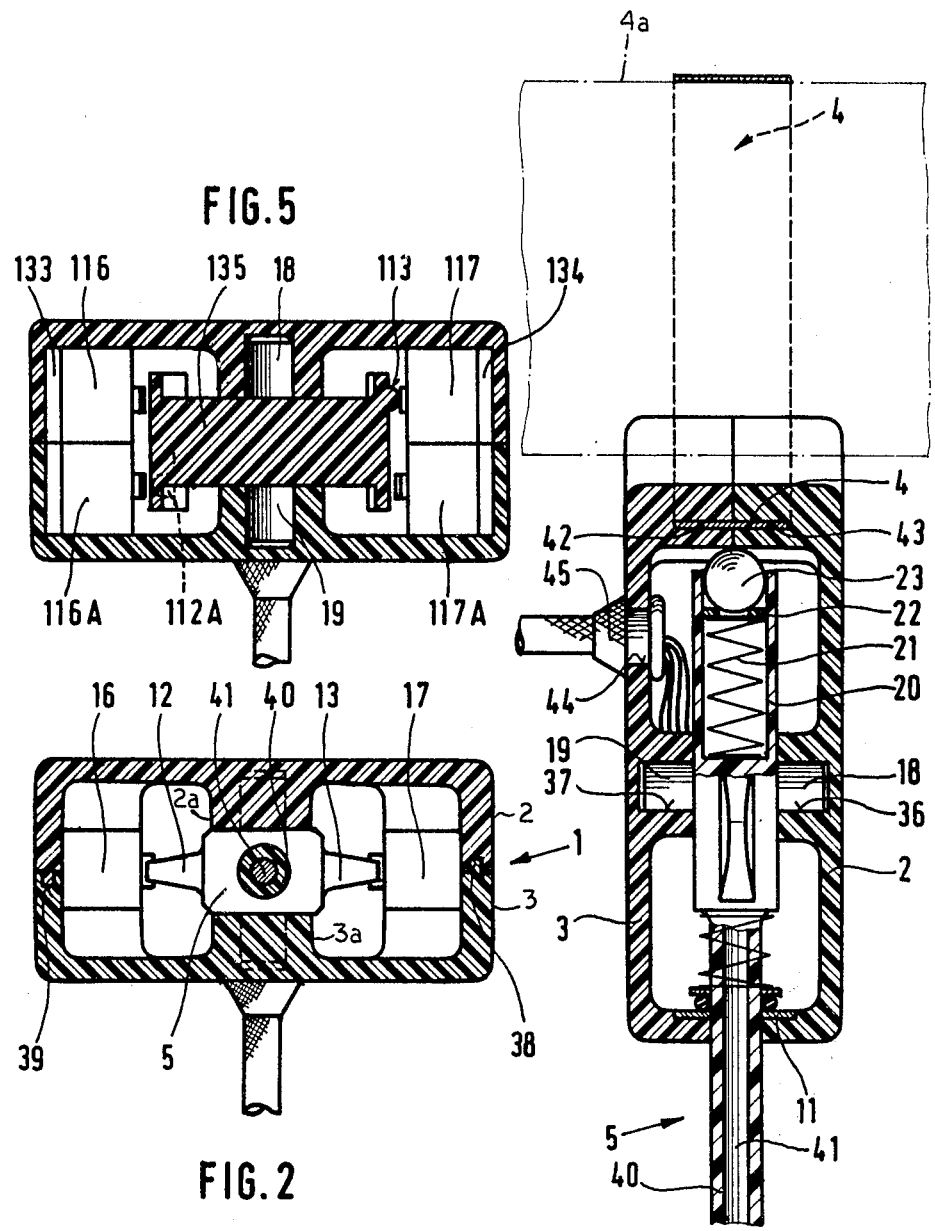

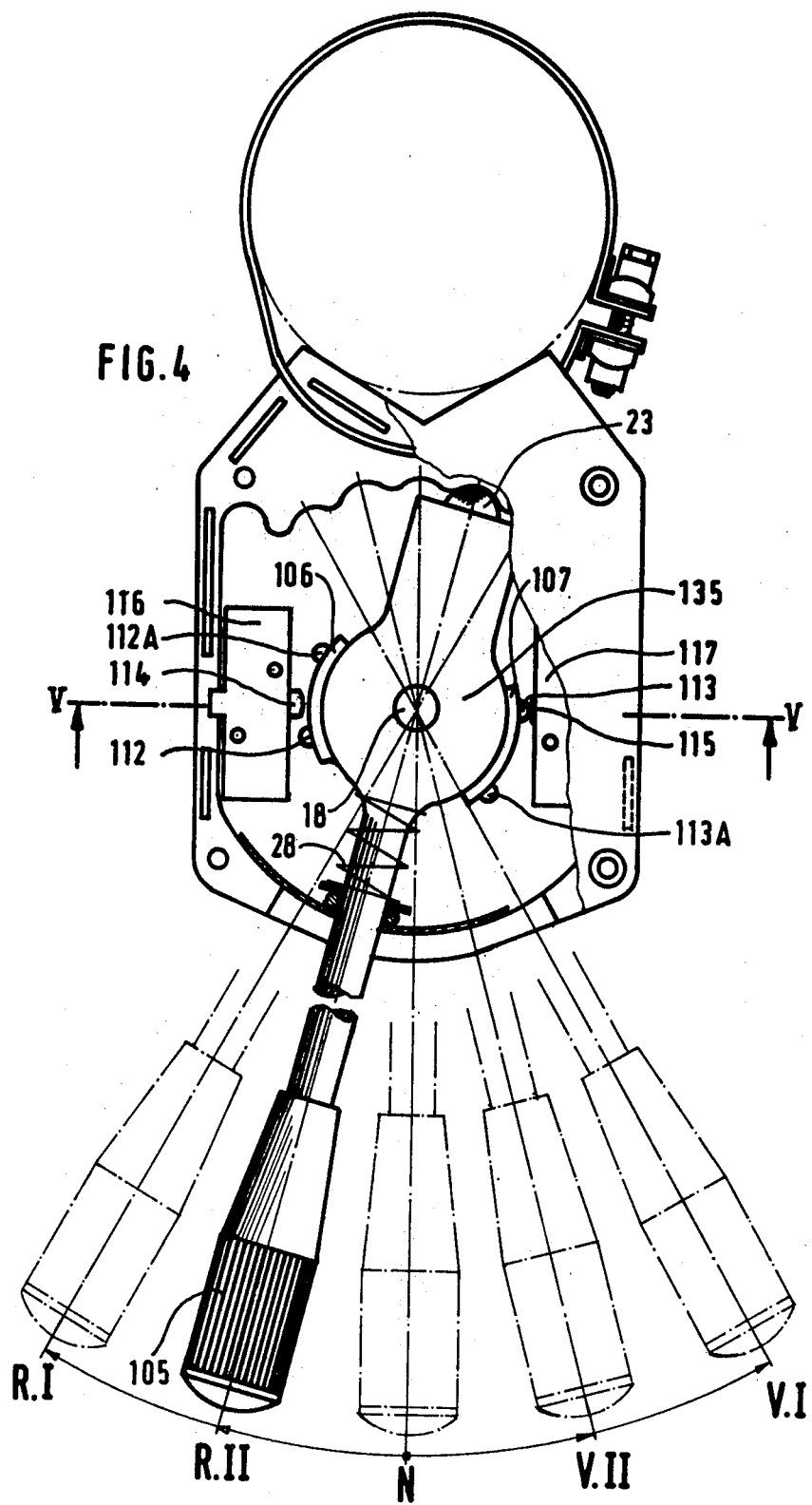

REVERSING SWITCH FOR MOTOR VEHICLE TRANSMISSION

FIELD OF THE INVENTION

Our present invention relates to an electrical switch for an electro-hydraulic motor vehicle transmission and, more particularly, a direction-selector switch for a transmission of the latter type which has a switch lever displaceable between forward-drive and reverse-drive positions.

BACKGROUND OF THE INVENTION

Electro-hydraulic transmissions can be provided with switching devices forming selector switches capable of selecting the direction and speed or transmission ratio of the drive. In British Pat. No. 1,327,040, for example, a switch is described which comprises a switch lever pivotally mounted in a housing for actuation of sensitive switches or microswitches which perform the direction-selection actuation.

This switch arrangement is somewhat complex, being composed of parts which must be attached by screws and which differ from one another so that they do not involve the use of interchangeable parts.

Assembly of the device is complex and, as a result, manufacture, assembly and use are somewhat complicated.

Other switch arrangement may be provided as well but here too the number of switch contacts and switching combinations which must be provided complicates the set-up of the switch, especially if it is intended for reversing applications, for example switch-over from forward to reverse drive or vice versa.

OBJECTS OF THE INVENTION

It is, therefore, the principal object of the present invention to provide a switch of the direction-selector type for an electro-hydraulic transmission for a motor vehicle which obviates the disadvantages of earlier switch devices.

Still another object of the invention is to provide a reversing switch for a machine of the aforedescribed type having components which are simple to construct and thus can be economically produced.

SUMMARY OF THE INVENTION

These objects and others which will become apparent hereinafter are attained, in accordance with the present invention, in a reversing switch for a motor vehicle electro-hydraulic transmission which comprises a housing provided with at least two electrical switch elements and a switch lever pivotally mounted in this housing for actuating the electrical switch elements.

According to the invention, the lever, which comprises a lever arm projecting from the housing and actuatable by the hand of the user, and a lever body within the housing forming the pivot axis for the lever, is unitarily composed of, for example, a molded synthetic resin and thus is of a one-piece construction consisting of the arm, the lever body forming the pivot by which the lever is swingably mounted in the housing, cams on the body for actuating the switch elements and a guide for a detent or indexing means, for example a spring-loaded ball, adapted to cooperate with means on the housing for indexing the lever in its selected positions.

Thus the lever arm is automatically, by being formed in one piece therewith, rigid with the cams, the pivot-forming portions and the guide for the indexing means.

When the lever is formed unitarily by molding it in one piece from a synthetic resin material, a reinforcement may be provided therein which can extend into this lever body as well as into the arm.

The one-piece construction of the switch lever enables simple mounting of the latter within the housing and facilitates fabrication of the individual parts as well as assembly of those components used with the lever, for example the indexing spring, indexing ball, and like elements.

According to a feature of the invention, surrounding the arm is a further spring, hereinafter referred to as a pressure spring, which bears axially outwardly in a direction opposite the direction in which the indexing spring urges the ball, against a sliding sheet (shutter) which rides on an arcuate surface formed by the interior of the housing and thus blocks the slot in the housing through which the arm projects.

According to a feature of the invention, the body is formed with a pair of oppositely extending pins which define the pivot axis of the body and which are aligned along this pivot axis which, of course, can be perpendicular to the axis of the arm.

Preferably the body is a flat member from which the pins extend in opposite directions to be received in tubular bosses molded on a pair of identical housing portions which are attached together in mirror symmetrical relationship so that their bosses receive the pins.

Since the housing portions can be formed as molded shells and can be identical, obviously the fabrication of the housing is a simple matter.

The two shell portions can define the aforementioned slot which is closed by a sealing shutter formed as the sliding sheet.

According to yet another feature of the invention, the two housing shells opposite this slot are formed with a plurality of indentations cooperating with the ball which constitutes the index member in the guide of the switch lever body. This ball can be urged by a synthetic resin disk outwardly, the disk forming a seat for the indexing spring.

The sliding sheet forming the shutter can be composed of metal and thus can be biased by its inherent resiliency in a slidable manner against the curved surfaces of the housing shelves thereby closing the slot in a dust-tight manner.

Each half shell can, moreover, be formed with slits which are traversed by the flexible band of a pipe clamp enabling the housing to be mounted upon a column.

It has been found to be advantageous to provide the halfshelf so that symmetrical with their longitudinal axis, the housing is formed with projections from one shelf half reaching toward the other and recesses on the opposite shelf half and such that the projections and recesses interfit to form junctions.

The reinforcement extending through the arm of the lever can be a wire and we have also found it to be advantageous to provide the cam means as a pair of cam formations to each side of a longitudinal median plane through the switch lever which can actuate respective pairs of switch elements.

BRIEF DESCRIPTION OF THE DRAWING

The above and other objects, features and advantages of the present invention will become more readily apparent from the following description, reference being made to the accompanying drawing in which:

FIG. 2 is a section taken along the line II—II of FIG. 1;

FIG. 3 is a section taken along the line III—III of FIG. 1;

FIG. 4 is a view similar to FIG. 1 illustrating another embodiment of the invention provided with two sets of cam formations on opposite sides of the lever body; and FIG. 5 is a cross section taken generally along the line V—V of FIG. 4.

SPECIFIC DESCRIPTION

Figure 1:
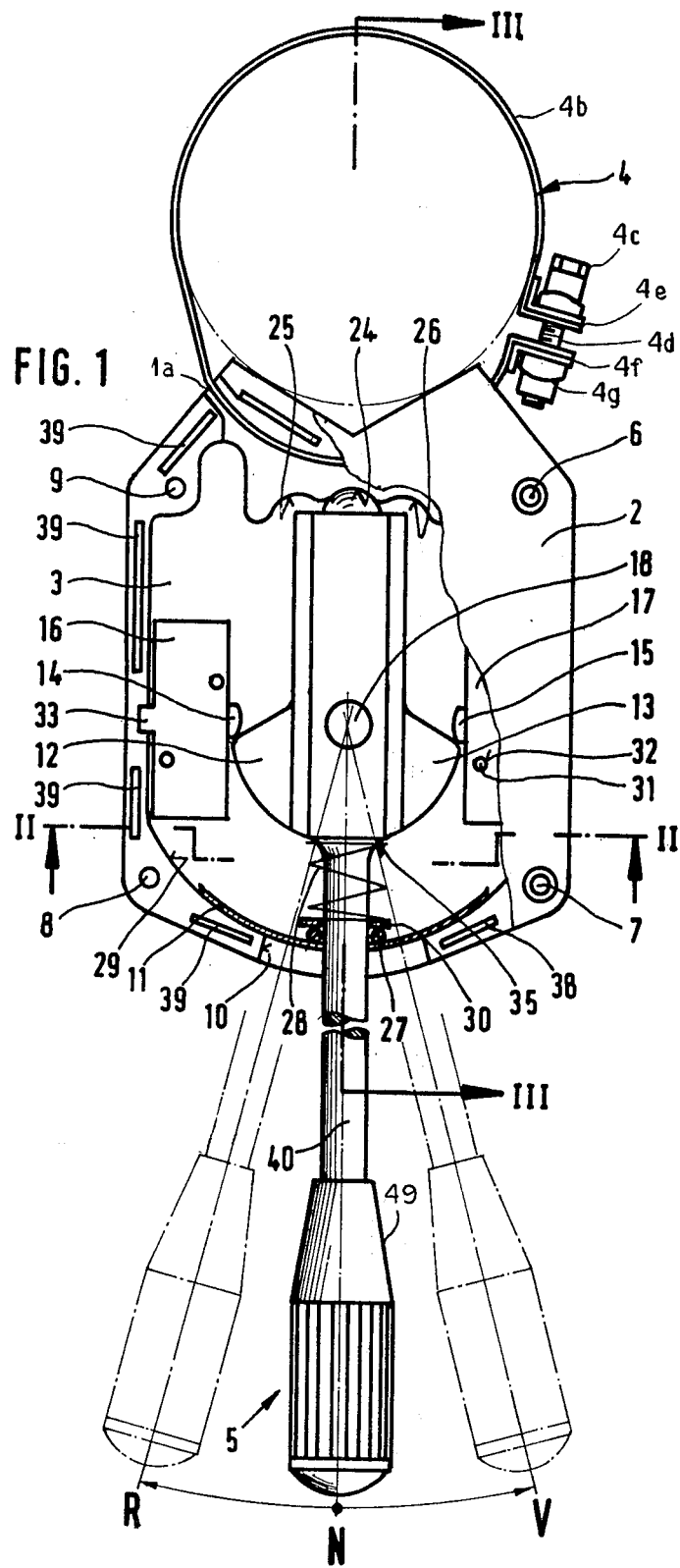
FIG. 1 is a plan view of the switch with the top half of the housing partly broken away according to the invention.

FIGS. 1 through 3 of the drawing illustrate an embodiment of the invention in which the switch lever has three positions in which it can be indexed, namely, a neutral position N, a forward position V and a reverse position R. In the embodiment of FIGS. 4 and 5, however, a total of five positions can be provided, namely, two forward positions V.I and V.II which can represent first and second forward speeds, the neutral position N and two reverse drive positions RI and RII also representing two reverse speeds.

While not particularly relevant to the specifics of the switch with which the present invention is primarily concerned, it should be noted that the switch can be utilized with any machine having an electrohydraulic transmission between, for example, a prime mover such as an internal combustion engine, and a load such as the driven wheels of a motor vehicle.

Typically the sensitive switches, frequently referred to as microswitches herein, are connected in electrical circuits with solenoid valves and the battery or another power source of the vehicle to control the hydraulic pressurization of hydraulic brakes or clutches which, in turn, can selectively immobilize certain elements of planetary gear transmissions or interconnect elements of planetary gear transmissions to other such elements or to various shafts to effect speed selection or direction selection.

The term "speed selection" is used to refer to the ratio interposed between the input and output shafts of the transmission, either in terms of speed or in terms of torque and the expression is thus equivalent to an expression such as "transmission ratio selection."

However, the term "direction selection" is used herein to indicate selection of either the forward or the reverse direction and, when the lever is used to select one direction or the other and does not also select a speed or speed range, some other control conventional in the art, may be required to provide ratio selection as described.

In FIGS. 1 through 3 we have shown a direction selector switch for a transmission of the type described which comprises a housing 1 having an upper and lower molded half shells 2 and 3 which can be identical but which are positioned in substantially mirror-symmetrical relationship as shown in FIG. 2 with the symmetry plane coinciding with a median plane through the housing and perpendicular to the plane of the paper in FIGS. 2 and 3. The housing 1 is affixed by a pipe clamp 4 to a column which has been represented only diagrammatically at 4a in FIG. 3, the pipe clamp comprising a strap 4b adapted to encircle the column and passing into the housing through a slot defined at 1a between the two housing parts and merging from the housing through a similar slot, the opposite ends of the strap being tightened together by rotation of the hex-head 4c of a screw 4d traversing the lugs 4e and 4f of the strap and threaded into a nut 4g engaging the lug 4f.

The two housing portions 2 and 3 are molded with registering bores 6, 7, 8, 9 at four corners of a rectangle and which can be traversed by screws which connect the two housing portions together. At an end of the housing remote from the column, the two housing portions define a slot 10 between them, this slot being formed in an arcuate wall 29 which is also defined by the two housing portions, the slot being covered by a sliding sheet (shutter) 11 of metal which rests, as a result of its inherent resiliency, along the arcuate surface 29 and moves with a switch lever generally referred to at 5.

In the solid line position shown in FIG. 1, this lever is in its neutral position. The lever comprises a lever arm 40 which is molded unitarily with a body 35 from synthetic resin material, the arm being reinforced by a metal rod or wire as shown at 41 in FIG. 2 and having a hand grip 49 which can be screwed or simply slid on the free end of this arm.

Before the grip 49 is mounted, a coil spring 28 is slipped over the arm 40 and seated against the body 35 at the junction of the arm 40 therewith, this spring forming a pressure spring which biases a pressure disk 30 against an O-ring 27 forming a seal between the O-ring 27, the arm 40 and the sheet 11 and urging the sheet 11 against the surface 29. Thus the sheet 11 moves the arm 40 and closes the slot 10 in a dust-tight manner.

The opposite ends of the slot 10 limit the angular stroke of the switch lever 5 so that, in the extreme positions thereof, the lever can occupy either the dot-dash position V, corresponding to forward speed, or the dot-dash position R, corresponding to reverse speed.

The body 35 is formed unitarily with a pair of lateral flanges or projections 12, 13, symmetrically of opposite sides of a median plane along the axis of the arm 40 and perpendicular to the plane of the paper in FIG. 1.

Members 12 and 13 are contact cams which operate the actuating pins 14 and 15 of a pair of sensitive switches (microswitches) mounted in the housing by having lugs 33 of these switches anchored in correspondingly shaped recesses in the housing walls of the housing 1.

Pins 31 which can be molded or fitted into the base portions of the shell halves 2 and 3, can fit into tubular rivets of these sensitive switches to retain the latter in position against the forces applied by the cams 12 and 13 when the lever 5 is respectively swung in the clockwise and counterclockwise senses from the neutral position shown in solid lines in FIG. 1.

The body 35 is also formed unitarily with a pair of oppositely projecting but axially aligned pins 18 and 19 of cylindrical configuration, these pins extending perpendicular to the median plane of the housing and being received respectively in tubular bosses 2a, 3a in the housing portions 2 and 3 respectively. These bosses are provided, as can be seen in FIG. 3, with blind bores 36 and 37 respectively. Thus, the unitary or one-piece structure of the switch lever 5 includes not only the arm 40 and the body 35 but also the cams 12 and 13 and the pins 18 and 19 which pivotally support the lever in the housing.

The body 35 is formed with another blind hole (FIG. 3) shown at 20 and forming a guide for a detent or indexing ball 23.

A coil spring (indexing spring) 21 is received in the bore 20 and bears against a setting disk 42 which is slidable in this bore and urges the ball 23 outwardly.

The ball 23 is engageable selectively in one of three arcuate recesses 24, 25 and 26 (in the neutral, forward and reverse positions) in the housing 1 to index the switch lever. The lever is thus held in its selected position until sufficient force is applied to overcome the force of the spring 21 and allow the ball 23 to jump into the next recess.

Both half shells 2 and 3 are formed on their confronting faces when they are in the position shown in FIGS. 2 and 3, projections 28 on one side and recesses 38 adapted to receive the projections, the projections and recesses 38, 39 centering the shells with respect to one another and enabling them to be interfitted.

FIG. 2 shows the two half shells 2 and 3 with the switch lever 5 disposed between them such that the pins 18 and 19 project into the blind bores of the two half shells.

From FIG. 3 it can be seen that the rear wall of the housing defined by the half shells forms the recesses or indentations 24, 25, 26 in which the ball can be engaged and hence the relationship of the indexing means with the housing. From this FIGURE as well as the strap of the pipe clamp running through slots 42 and 43 can be seen.

The half shell 3 can be formed with a bore in which a grommet 45 is anchored to retain the leads connected to the switches.

In the embodiment of FIGS. 4 and 5 additional recesses are provided for the indexing ball and, in this embodiment, the body or hub portion 135 of the switch lever 105 has two segments 106, 107, each of which has a pair of cams 112, 113 and 112A, 113A disposed in different planes (see FIG. 5) for actuating respective pins 114 of stacked switches 116, 116A and 117, 117A on each side of the housing. On changing to the additional forward or reverse speeds, the additional switches are thus operated by the added cams.

The remaining parts of the housing and other structure similar to that described in connection with FIGS. 1 through 3 have been designated by similar reference numerals preceded by a hundreds digit.

We claim:

1. A direction-selection switch for an electrohydraulic transmission comprising:
a housing;
a unitarily molded one-piece switching lever having a body received in said housing and formed with:
at least one pair of cams on opposite sides of said body,
an arm extending from said housing and actuatable to swing said lever,
means on said body journaling said lever on said housing, and
a guide adapted to receive an indexing member for releasably positioning said lever in a plurality of selected positions; and
respective switches in said housing connectable with said transmission and actuatable by said cams selectively in said positions, said journaling means including a pair of pins molded on said body and defining a pivot axis for said lever, said housing being formed by a pair of half shells joining at a parting plane and each having a bore receiving one of said pins, said housing being formed with a slot in an arcuate wall along said plane through which said arm extends, and
a shutter in the form of a sheet strip carried by said arm within said housing, sliding on said arcuate wall and sealing said slot in a dust-tight manner in all positions of said arm, said indexing member being a single ball aligned with said arm, said guide being formed as a bore receiving a compression spring and a disk biasing said ball against a further wall of said housing opposite said arcuate wall and formed with recesses in which said ball can be received.

2. The switch defined in claim 1 wherein said disk is composed of a synthetic resin material.

3. The switch defined in claim 1, or claim 2 wherein a spring is mounted on said arm in said housing and is seated against said body to urge an O-ring surrounding said arm against said shutter and said shutter against an arcuate wall of said housing.

4. The switch defined in claim 1 wherein said half shells are formed of synthetic resin material.

5. The switch defined in claim 4 wherein said half shells are formed with slots receiving a strap of a pipe clamp for mounting said switch upon a column.

6. The switch defined in claim 4 wherein said half shells are formed with mating projections and recesses for aligning said half shells with one another.

7. The switch defined in claim 1, claim 2 or claim 4 wherein said arm is reinforced by a wire.

8. The switch defined in claim 1, claim 2 or claim 4 wherein pairs of switches in stacked relationship are provided on each side of said housing and said cams include cam members at different levels on each side of said housing for actuating said switches.

* * * * *